US012578593B2

(12) United States Patent (10) Patent No.: US 12,578,593 B2

Galinier (45) Date of Patent: Mar. 17, 2026

(54) SPIRAL DIOPTRE WITH MERIDIANS OF DIFFERENT OPTICAL POWER

(71) Applicant: SPIRAL, Caen (FR)

(72) Inventor: Laurent Galinier, Bordeaux (FR)

(73) Assignee: SPIRAL, Caen (FR)

( * ) Notice: Subject to any disclaimer, the term of this patent is extended or adjusted under 35 U.S.C. 154(b) by 860 days.

(21) Appl. No.: 17/622,664

(22) PCT Filed: Jun. 29, 2020

(86) PCT No.: PCT/EP2020/068196

§ 371 (c)(1),
(2) Date: Dec. 23, 2021

(87) PCT Pub. No.: WO2020/260679

PCT Pub. Date: Dec. 30, 2020

(65) Prior Publication Data

US 2022/0244569 A1 Aug. 4, 2022

(30) Foreign Application Priority Data

Jun. 28, 2019 (FR) ...................................... 1907112

(51) Int. Cl.
*G02C 7/00* (2006.01)
*A61F 9/02* (2006.01)
*G02C 7/02* (2006.01)
*G02C 7/04* (2006.01)

(52) U.S. Cl.
CPC ............. *G02C 7/042* (2013.01); *G02C 7/044* (2013.01); *G02C 7/045* (2013.01)

(58) Field of Classification Search
CPC .. A61F 9/026; G02C 7/00; G02C 7/04; G02C 7/041; G02C 7/02; G02C 7/024; G02C 7/025; G02C 7/027
USPC ...... 351/159.41, 41, 159.01, 159.02, 159.05, 351/159.06, 159.12, 159.14, 159.21,
(Continued)

(56) References Cited

U.S. PATENT DOCUMENTS 5,198,844 A † 3/1993 Roffman
5,408,281 A † 4/1995 Zhang
5,517,260 A 5/1996 Glady et al.
(Continued)

FOREIGN PATENT DOCUMENTS

EP 0522852 A1 1/1993
EP 2634619 A1 9/2013
(Continued)

OTHER PUBLICATIONS

International Search Report corresponding to International Application No. PCT/EP2020/068196 dated Oct. 27, 2020, 8 pages.
(Continued)

*Primary Examiner* — Dawayne Pinkney

(74) *Attorney, Agent, or Firm* — Ronald M. Kachmarik; Cooper Legal Group LLC

(57) ABSTRACT

An optical device having an optical axis. The device includes at least one surface with at least two meridians, at least one portion of which forms, seen face-on, at least one spiral segment the central point of which is on the optical axis. Each spiral segment defining meridians of different optical powers. The focus obtained extends over a tubular region.

12 Claims, 7 Drawing Sheets

(58) Field of Classification Search
USPC .......................... 351/159.38, 159.72, 159.74,
351/159.75–159.77
See application file for complete search history.

(56) References Cited

U.S. PATENT DOCUMENTS

| | | | | | |
|---|---|---|---|---|---|
| 6,454,408 | B1 | 9/2002 | Morris et al. | | |
| 11,754,858 | B2 * | 9/2023 | Webber | .................... | G02C 7/06 |
| | | | | | 351/159.41 |
| 2003/0117577 | A1 † | 6/2003 | Jones | | |
| 2009/0323020 | A1 | 12/2009 | Zhao et al. | | |
| 2013/0222761 | A1 | 8/2013 | Hansen et al. | | |
| 2015/0362746 | A1 | 12/2015 | Skudder | | |
| 2016/0220350 | A1 | 8/2016 | Gerlach | | |
| 2021/0341752 | A1 * | 11/2021 | Webber | .................. | G02C 7/042 |
| 2023/0125705 | A1 * | 4/2023 | Bradley | .................. | G02C 7/04 |
| | | | | | 351/205 |

FOREIGN PATENT DOCUMENTS

| | | | |
|---|---|---|---|
| EP | 2955566 | A1 | 12/2015 |
| JP | H05-188332 | A | 7/1993 |
| JP | 2013-178517 | A | 9/2013 |
| JP | 2016-004264 | A | 1/2016 |

OTHER PUBLICATIONS

Japanese Office Action from Corresponding Japanese Patent Application No. 2021-577913, dated Mar. 5, 2021.
2020-2021 BCSO Basic and Clinical Science Course; American Academy of Ophthalmology 2024, 6 pages.†

* cited by examiner
† cited by third party

SPIRAL DIOPTRE WITH MERIDIANS OF DIFFERENT OPTICAL POWER

TECHNICAL FIELD

The present invention relates to the field of optical devices forming dioptric interfaces.

Although described with reference to an application to an ophthalmic lens, the invention applies to any, spherical or toric, dioptric interface and to any dioptric interface the surface of which has at least two meridians, which may be used for image formation and/or optical-power distribution and/or vision correction.

Thus, an optical device according to the invention may be an optical lens of an optical system, a spectacle lens or a rigid or flexible contact lens, one portion of a photographic objective, one portion of a motion detector, or a device for concentrating light energy.

Generally, the invention is applicable to any application in which light is focused, in the visible or invisible domain.

PRIOR ART

A lens, for example an ophthalmic lens, comprises two opposite optical surfaces, which are called dioptric interfaces, connected by an edge face that is generally inscribed in a cylinder of circular base.

At the present time, optical surfaces are generally classified into four separate categories, namely:

spherical dioptric interfaces, the surface of which is a portion of an internal or external surface of a sphere;

aspheric dioptric interfaces, which are derived from spherical surfaces and the surface of which is a portion of a surface of revolution, the curvature of which varies continuously from the apex to the periphery;

toric dioptric interfaces, the surface of which has two orthogonal main meridians of unequal curvature and the cross section of which along these two meridians is nominally circular;

atoric dioptric interfaces, the surface of which has two main meridians that are mutually perpendicular and of unequal curvature and the cross section of at least one of the main meridians of which is not circular.

The focus of a spherical lens formed by the association of two spherical dioptric interfaces has a single focal distance, to a point called the image focal point. This pointwise focus is characteristic of a so-called "stigmatic" optical system.

With reference to FIG. 1, the well-known principle of the astigmatism (absence of the single-point stigmatism obtained with a spherical lens) produced by an optical lens having a toric surface 1 will be recalled.

The toric surface 1 has a first meridian 2 that is curved with a first curvature C1 about an axis of revolution of a torus (not shown in the figure) so that the first meridian 2 forms a circular arc of a first circle defined by an outside radius of the torus.

The toric surface 1 also has a second meridian 3 perpendicular to the first meridian 1 and curved with a second curvature C2 greater than the first curvature about a center of curvature located on the radius of the torus that passes through the middle of the first meridian 2—designated with the reference A-A. The axis A-A is the optical axis of the toric surface.

The lens is formed in an optical material of refractive index n, so that light passing through said toric surface 1 undergoes refraction.

In particular, under a parallel illumination, light that passes through the first meridian 2 converges at a first focal distance 4, thereby forming a section 5 parallel to the first meridian 2, and light passing through the second meridian 3 converges at a second focal distance 6, thereby forming a section 7 parallel to the second meridian 3.

The toric lens 1 has two dioptric powers D1 and D2, which are given by the following relationships: $D1=(n-1)C1$ and $D2=(n-1)C2$.

U.S. Pat. No. 5,198,844 discloses a multifocal lens divided into a plurality of alternating sections that have at least two different refractive powers. In one embodiment, the boundaries between successive sections are arcs starting from the center of the lens. This lens solely comprises spherical or aspherical sections, these sections furthermore having surface junctions taking the form of ridges.

Generally, there is a need to improve so-called stigmatic optical devices of spherical surface, in order to lengthen their focal region.

One aim of the invention is to at least partly meet this need.

DISCLOSURE OF THE INVENTION

To do this, the invention relates, according to one aspect, to an optical device having an optical axis, comprising at least one surface with at least two meridians, at least one portion of which forms, seen face-on, at least one spiral segment the central point of which is on the optical axis, each spiral segment defining meridians of different optical powers, in order that the focus no longer simply be one-point stigmatic but extend over a tubular region that stretches out along the optical axis.

By "seen face-on", what is meant here and in the context of the invention is a view of the device along the optical axis. In other words, it is a question of a view in projection onto a plane orthogonal to the optical axis.

For the sake of clarity, the spiral-shaped surface portion is defined in projection onto a plane orthogonal to the optical axis. Since a spiral segment according to the invention is developed on a three-dimensional surface, it is a question of a helix.

Thus, the invention essentially consists in generating, from a surface with two or more meridians of a dioptric interface, a surface comprising at least one helix segment, i.e. a spiral-shaped surface in projected view onto a plane orthogonal to the optical axis.

In other words, the invention essentially consists in creating a dioptric interface having a spiralization of a surface with two meridians.

In some respects, if the surface with two or more meridians were in a malleable state, what would be done is to torsionally deform this surface along one or more spiral-shaped curves.

This spiralization may be applied to any non-spherical dioptric-interface surface that has more than two meridians.

The spiralization is preferably carried out on a toric surface, and more preferably on an optical device comprising two concentric tori with meridians that are in opposition, i.e. at 90° to each other.

In the case of a toric surface, this allows light to be distributed, via the curvature of the first meridian, to a first focal distance, and light to be distributed, via the curvature of the second meridian, to a second focal distance, while the spiralization of the astigmatism axes has the effect of creating a spiraled focal light tube and thus of increasing the focal distance of the dioptric interface.

A spiral segment according to the invention may have different shapes, for example according to a linear law, a quadratic law or a substantially logarithmic law. These various laws may also be combined on the same surface of an optical device, for example to obtain a lens with a logarithmic law in a first annular segment of the lens and a quadratic or linear law in a second annular segment of the lens surrounding the first annular segment.

A spiral segment according to the invention may be created in only one portion of a dioptric interface. It may thus be created only in a central portion, in a junction portion between two separate surfaces, two toric surfaces for example, or in a peripheral portion.

The tubular focus obtained according to the invention is a focus that remains the same over an elongated range of focal distances and that is inscribed in a tube.

The invention has many advantages, among which mention may be made of:

the ability to decrease the need to adjust focus in any optical image-forming system, such as a photographic objective, a camera, a projector objective, a virtual reality headset, etc.;

the ability to decrease the bulk of an optical image-forming system, for example by removing the motorized focusing devices currently employed;

its ability to be used in systems for concentrating optical power, such as solar heating systems or laser cutting devices. For example, in a laser cutting device, the tubular focus allows the length of the focal region along the optical axis to be increased and thus the thicknesses that may be cut to be increased;

its ability to be used in optical detecting systems, such as infrared motion detectors or physical measurement systems, the length of the region of sharpness due to the tubular focus advantageously decreasing the need to adjust focus;

in applications to correction of vision, the tubular focus allows a region of sharpness to be generated over a long range of focal distances, for example so as to ensure, with a single ophthalmic lens, near and far vision and allow optical compensation for presbyopia and a number of ametropias. One ophthalmic lens may thus be used for more than one single ametropia value. The tubular focus also allows the focus of rays off the optical axis to be improved, so as to improve the field of view. This may be put to particularly good use in ophthalmic lenses. An optical lens one surface of which has been generated by the spiralization according to the invention in particular allows the caustic of the focal lengths to be lengthened.

Generally, an optical device implementing the invention may be used in any image-forming application, for example photography, video, optical detection, vision correction, and in any other application requiring a focus.

An optical device, in particular a lens, may be made from any optical material such as optical glass or a polymer.

The one or more spiral segments according to the invention may be produced using a machining, additive-manufacturing or molding technique or using a combination of a number of these techniques.

According to one advantageous embodiment, the one or more spiral segments are generated from a toric surface having a first meridian curved with a first non-zero curvature and a second meridian curved with a second curvature strictly greater than the first curvature, the second meridian being perpendicular to the first meridian.

According to this embodiment and one advantageous variant embodiment, the one or more spiral segments are generated from first and second toric surfaces, the first toric surface having a first meridian curved with a first non-zero curvature about an axis of revolution of a first torus and a second meridian curved with a second curvature strictly greater than the first curvature, the second meridian being perpendicular to the first meridian, the second toric surface having a first meridian curved with a first non-zero curvature about an axis of revolution of a second torus and a second meridian curved with a second curvature strictly greater than the first curvature and perpendicular to the first meridian of the second toric surface, the first and second toric surfaces each comprising a plurality of azimuthal angular sectors arranged about the optical axis, the first meridian of the first toric surface and the first meridian of the second toric surface have azimuthal orientations separated by a non-zero angle about the optical axis, the spiral segments defining first and second optical-power meridians resulting from the first meridian of the first toric surface and from the first meridian of the second toric surface.

According to one variant embodiment, an azimuthal angular sector of the first toric surface and an azimuthal angular sector of the second toric surface are adjacent via a spiral-segment border.

The first and second toric surfaces may each comprise two diametrically opposed azimuthal angular sectors.

Each angular sector of the first toric surface may be adjacent to the two angular sectors of the second toric surface.

According to one advantageous feature, the angle between the azimuthal orientations of the first meridian of the first toric surface and the first meridian of the second toric surface is comprised between 60° and 90°.

Preferably, the first curvature of the first toric surface is equal to the first curvature of the second toric surface.

More preferably, the second curvature of the first toric surface is equal to the second curvature of the second toric surface.

According to one variant embodiment, the radius of a spiral segment is related, in polar coordinates, to the angle of the spiral by a linear law, a quadratic law or a logarithmic law.

According to another embodiment, the optical device furthermore comprises a spherical surface centered on the optical axis.

The optical device according to the invention may advantageously form an optical lens the front face of which is the surface with at least one spiral segment.

Another subject of the invention is the use of an optical device such as has just been described, for correcting vision and/or concentrating luminous power and/or forming an image.

BRIEF DESCRIPTION OF THE DRAWINGS

Other advantages and features of the invention will become more clearly apparent on reading the detailed but non-limiting description of examples of implementation of the invention, which is given by way of illustration with reference to the following figures, in which.

DETAILED DESCRIPTION

Figure 1:
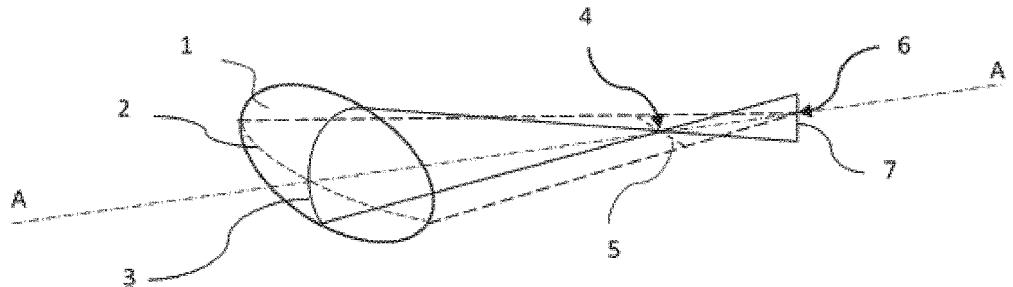
FIG. 1 is a schematic representation of the distribution of a parallel light beam having passed through an optical lens of toric surface.

FIG. 1, which relates to the prior art, has already been commented on in the preamble. It is therefore not described in further detail below.

The following figures show a number of examples of optical lenses according to the invention, comprising surfaces with more than two meridians with at least one spiral segment generating a focus that extends over a tubular region.

As may be seen from the various figures, a spiralization segment may be produced in various ways, for example according to a linear law, a quadratic law or a substantially logarithmic law. These various laws may also be combined in the same lens, for example with a logarithmic law in a first annular segment of the lens and a quadratic or linear law in a second annular segment of the lens surrounding the first annular segment.

A given optical device may comprise a plurality of spiral segments.

Figure 2:
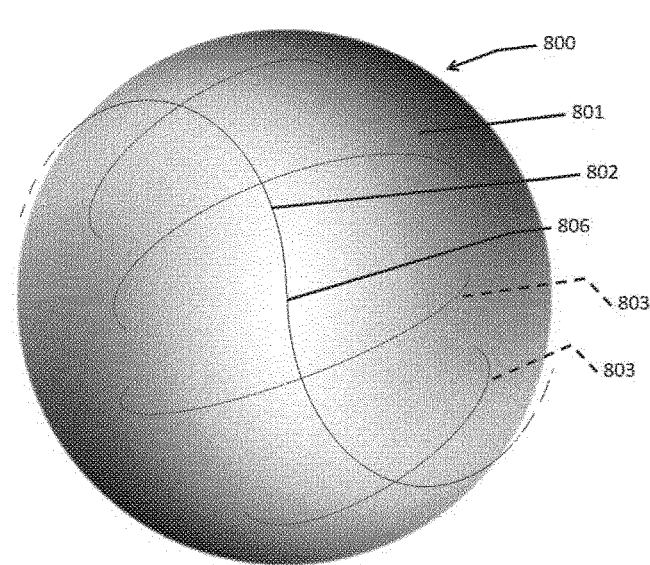
FIG. 2 is a schematic face-on view of a first embodiment of the optical lens of tubular focus.

FIG. 2 shows an optical lens 800 of tubular focus according to a first embodiment of the invention. The representation used indicates with contrast the separation perpendicular to the plane of the figure: darker means further from the reader and lighter means closer to the reader. The optical lens 800 is generated by spiralization of a toric surface of the lens as illustrated in FIG. 1. The central point is 806. Thus, the geometry of the surface 801 has a spiral the central point 806 of which is on the optical axis. In polar coordinates, the angle of the spiral increases with radial distance from the optical axis. In particular, the first meridian 802 having the first curvature in addition has a shape spiraled about the optical axis. In addition, lines 803 that have the second curvature and that would be parallel to the second meridian in the toric lens of FIG. 1 here have different azimuthal orientations, the orientation of the lines changing with distance from the optical axis because of the spiralization.

In fact, in order to achieve the invention, after having analyzed the shortcomings of prior-art multifocal lenses, the inventor sought to stretch the focal region out along the optical axis.

Starting with multifocal lenses with two concentric toric surfaces, he then thought of putting them in axial opposition.

Figure 3:
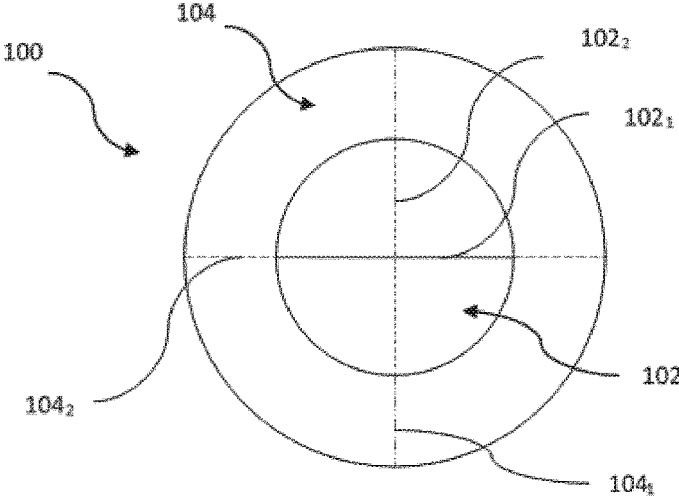
FIG. 3 is a schematic face-on view of a multifocal optical lens with two toric surfaces in axial opposition.
Figure 4:
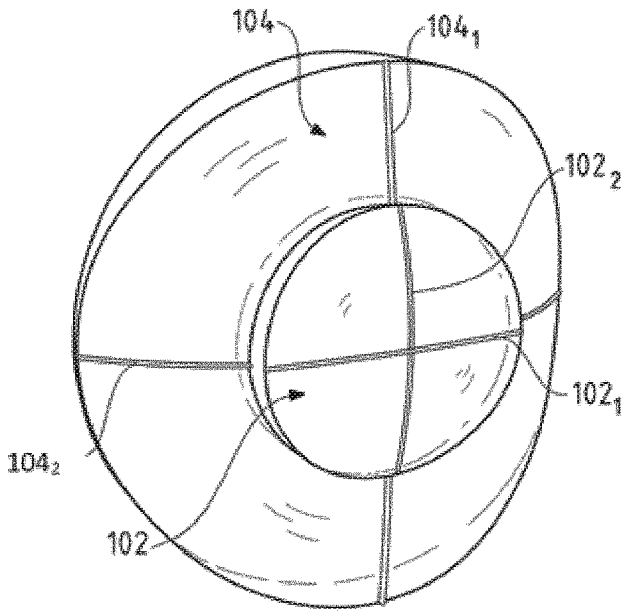
FIG. 4 is a schematic perspective view of the multifocal optical lens of FIG. 3.

FIGS. 3 and 4 show a face-on and perspective view of such a multifocal optical lens 100. The multifocal optical lens 100 comprises a first toric surface 102 and a second toric surface 104 that encircles the first surface 102 concentrically.

Thus, if the lens 100 is viewed axially along the optical axis A-A, the first surface 102 corresponds to a first optical region and the second surface 104 corresponds to a second optical region that is concentric with the first surface 102.

The first toric surface 102 has a first meridian $102_1$ curved with a first curvature and a second meridian $102_2$ curved with a second curvature and perpendicular to the first meridian $102_1$. Likewise, the second surface 104 has a first meridian $104_1$ curved with a first curvature and a second meridian $104_2$ curved with a second curvature and perpendicular to the first meridian $104_1$. In particular, on each of the first and second surfaces 102, 104, the second curvature is greater than the first curvature.

The periphery of each of the first and second surfaces 102, 104 is a circular section.

The first meridian $102_1$ of the first surface 102 is perpendicular to the first meridian $104_1$ of the first surface 104.

The first curvature of the first surface 102 may be different from or equal to the first curvature of the second surface 104. Likewise, the second curvature of the first surface 102 may be different from or equal to the second curvature of the second surface 104.

Thus, the lens 100 comprises two concentric tori having different meridian axes, which are especially in opposition or in a counter-axial format, i.e. such that there is an angle of 90° between the two tori.

Figure 5:
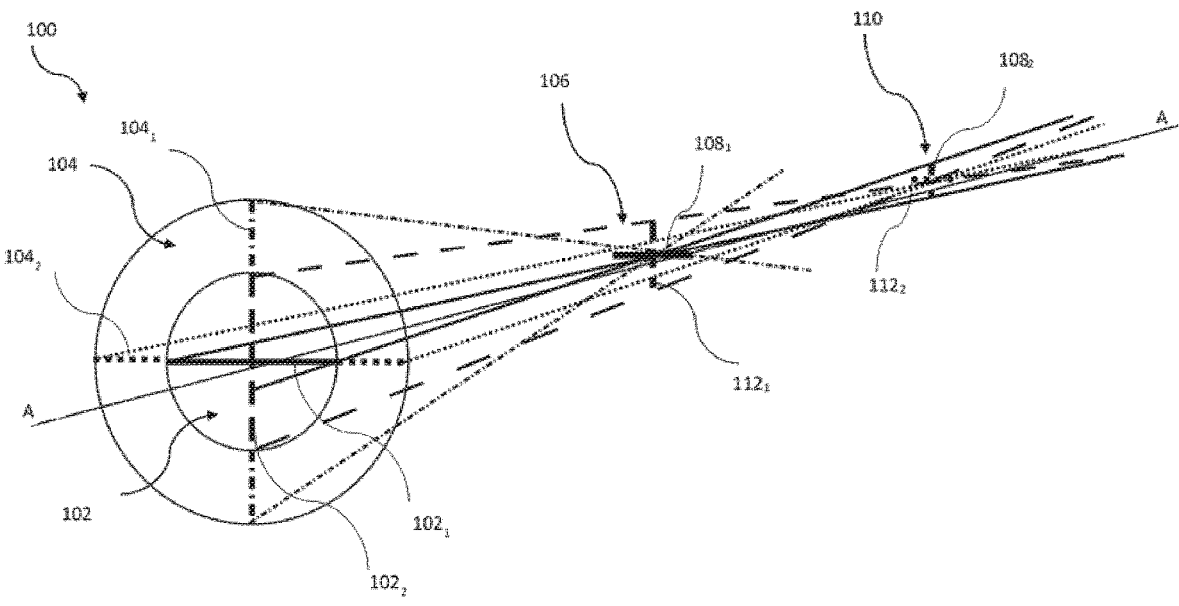
FIG. 5 is a schematic view of the distribution of a parallel light beam having passed through the optical lens of FIGS. 3 and 4.

FIG. 5 illustrates the distribution of light having passed through the multifocal optical lens 100 under a parallel illumination in an example in which the first curvature of the first surface is equal to the first curvature of the second surface and in which the second curvature of the first surface is equal to the second curvature of the second surface. Light that passes through the first meridian $102_1$ of the first surface 102 converges at a first focal distance 106, thereby forming a first section 1081 parallel to the first meridian 1021, and light that passes through the second meridian 1022 of the first surface 102 converges at a second focal distance 110, forming a second section 1082 parallel to the second meridian 1022.

In addition, light that passes through the first meridian $104_1$ of the second surface 104 converges at the first focal distance 106, thereby forming a first section $112_1$ parallel to the first meridian $104_1$ and light that passes through the second meridian $104_2$ of the second surface 104 converges at the second focal distance 110, thereby forming a second section 1122 parallel to the second meridian 104₂.

Thus, with such a lens 100, the focal region obtained is longer than the focal regions of prior-art multifocal lenses. This elongated focal region is dependent on the toricity of the surfaces 102, 104.

Observing that this focal region was not sufficiently concentrated, the inventor then thought of carrying out the spiralization of the surfaces, in order to obtain a focus concentrated in a tubular region and thereby to make it possible to obtain a focus over a longer distance along the optical axis.

Figure 6:
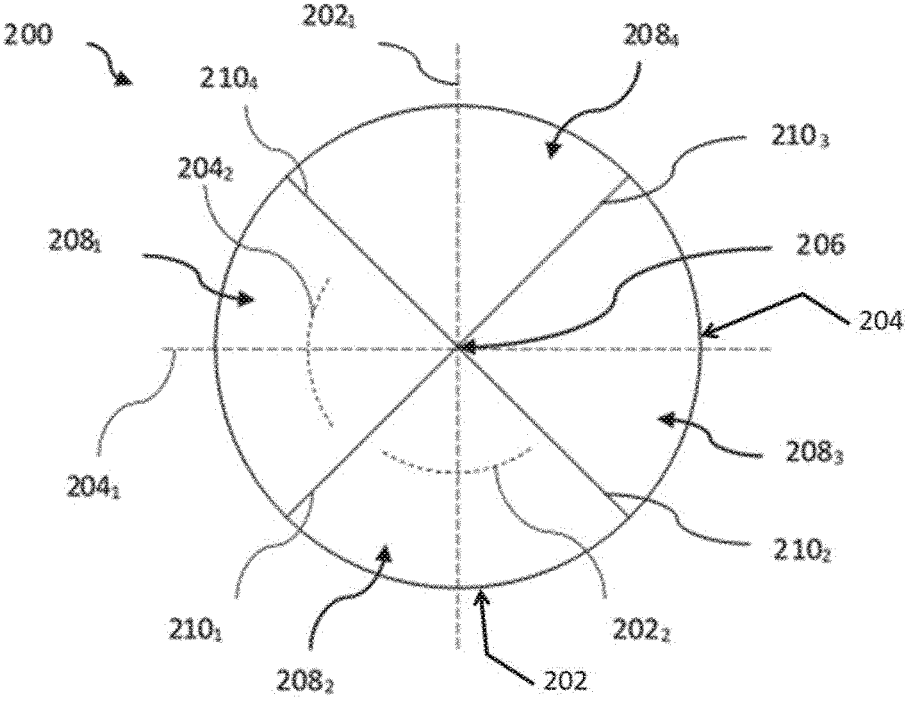
FIG. 6 is a schematic face-on view of an embodiment of a multifocal optical lens with two toric surfaces in axial opposition.
Figure 7:
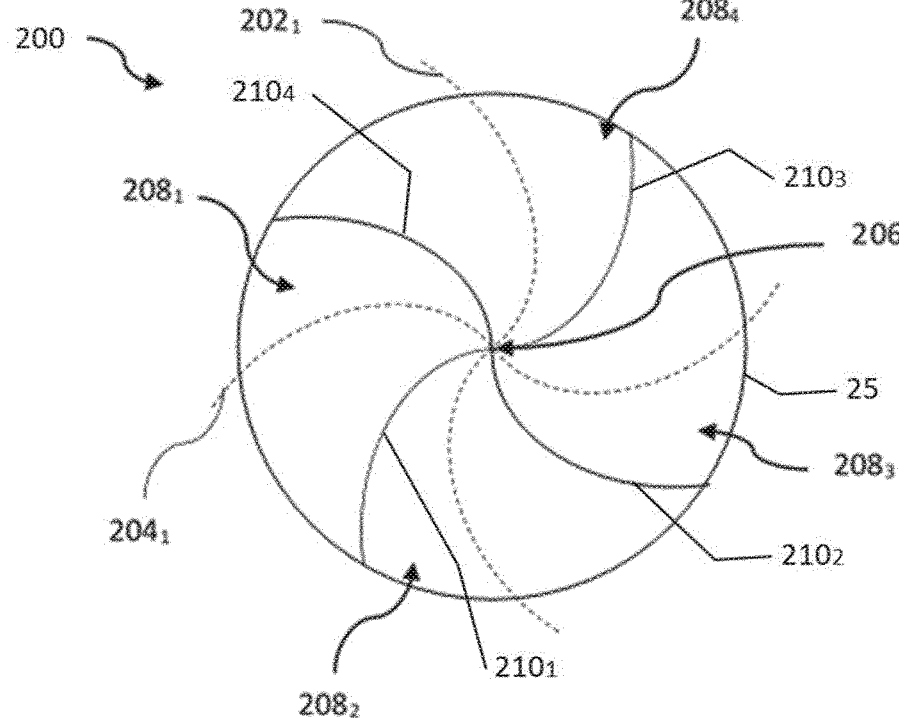
FIG. 7 is a schematic face-on view of an embodiment of the lens of tubular focus according to the invention generated from the geometry of the lens of FIG. 6.

FIGS. 6 and 7 illustrate an embodiment of an optical lens 200 of tubular focus and with a double toric surface, in axial opposition and in spiraled axial opposition, respectively.

The optical lens 200 of FIG. 6 comprises a first toric surface 202 having a first meridian 202₁ that is curved with a first curvature about an axis of revolution of a first torus, and a second meridian (represented by an arc 202₂ parallel to the second meridian) that is curved with a second curvature greater than the first curvature and perpendicular to the first meridian 202₁. The optical lens 200 also comprises a second toric surface 204 that is juxtaposed with the first toric surface 202 and that has a first meridian 204₁ that is curved with a first curvature about an axis of revolution of a second torus, and a second meridian (represented by an arc 204₂ parallel to the second meridian) that is curved with a second curvature and perpendicular to the first meridian 2041. Seen face-on, i.e. in projection onto a plane of projection perpendicular to an optical axis of the lens 200 passing through its center 206, the first toric surface 202 corresponds to two azimuthal angular sectors 208₂ and 208₄ that are diametrically opposed and that meet at their apexes, which are turned toward the center 206 of the optical lens 200. In the same way, the second toric surface 204 corresponds to two azimuthal angular sectors 208₁ and 208₃ that are diametrically opposed and that meet at their apexes, which are turned toward the center 206. Each azimuthal angular sector 208₂ and 208₄ of the first toric surface 202 is adjacent to the two azimuthal angular sectors 208₁ and 208₃ of the second toric surface 204. The angular sectors 208 are bounded by the intersections of the first toric surface 202 and of the second toric surface 204, which are lines of intersection in space between two cylindrical-section rings the axes of revolution of which are perpendicular. These intersection lines have been represented by the borders 210₁, 210₂, 210₃ and 210₄ between the azimuthal angular sectors 208₁, 208₂, 208₃ and 208₄. In space, each of the borders 210₁, 210₂, 210₃ and 210₄ is arranged set back in the direction of the optical axis with respect to the first meridians 2021 and 2041.

FIG. 7 shows an optical lens 200 generated by a spiralization of the toric lens surfaces in FIG. 6. Thus, the first meridian 202₁ of the first toric surface 202 and the first meridian 204₁ of the second toric surface 204 is a spiral segment the central point 206 of which is on the optical axis of the optical lens 200. Likewise, each of the borders 210₁, 210₂, 210₃ and 210₄ is a spiral segment the central point 206 of which is on the optical axis of the optical lens 200.

The spiralization may be produced in various ways, for example according to a linear law, a quadratic law or a substantially logarithmic law. For the application of a logarithmic law, a simplification must be made in proximity to the center 206 of the lens, where the spiral angle would be mathematically divergent.

In the example shown in FIG. 7, the increasing angle reaches 45° at the periphery 25 of the optical lens 200. This angle could have another value, for example comprised between 30° and 720°, and in particular equal to 60°. The periphery 25 of the optical lens 200 here has a circular shape. This shape may be other than circular.

Figure 8:
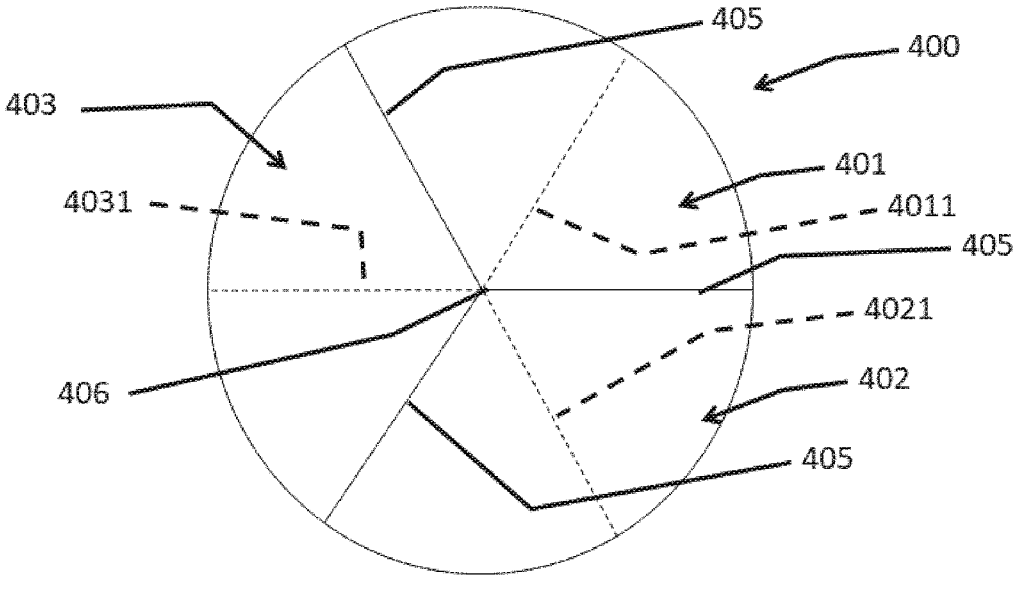
FIG. 8 is a schematic face-on view of another embodiment of a multifocal optical lens with two toric surfaces in axial opposition.
Figure 9:
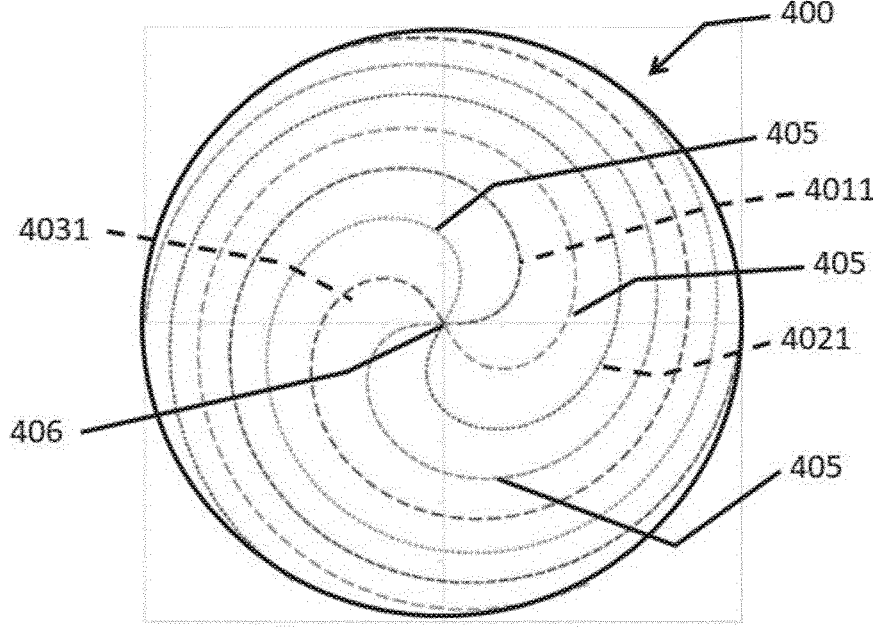
FIG. 9 is a schematic face-on view of another embodiment of the lens of tubular focus according to the invention generated from the geometry of the lens of FIG. 8.

FIGS. 8 and 9 illustrate an embodiment of an optical lens 400 of tubular focus and with a double toric surface, in axial opposition and in spiraled axial opposition, respectively.

The optical lens 400 of tubular focus of FIG. 8 is designed similarly to the optical lens 200 of FIG. 6, but with three separate azimuthal sectors 401, 402, and 403 instead of four azimuthal sectors. Each azimuthal sector 401, 402, 403 has a toric surface segment, with respective first meridians 401₁, 402₁, 403₁ that are oriented in various azimuthal directions, at 120° to each other in the symmetrical case such as shown. The second meridians are not shown here but are in each and every case perpendicular to the respective first meridians. The azimuthal sectors 401, 402, 403 are bounded by borders 405.

FIG. 9 illustrates a lens 400 of tubular focus generated from the lens surface in FIG. 8. Here, the spiral segments respect a quadratic spiralization law: the spiral angle is proportional to the square of the radial distance from the center 406 on the optical axis. Each of the borders 405 and each of the prime meridians 401₁, 402₁, 403₁ has the same spiral geometry. In the example shown, the spiral angle reaches 360° at the periphery of the optical lens 400, i.e. one complete revolution. A second complete revolution could be made for a lens of larger size, i.e. an angle of 720° or more.

By way of numerical example, an optical lens 400 of tubular focus of FIG. 9 has been implemented with a front face with four identical toric branches, the parameters of which are as follows:

first curvature of the toric surface: focal distance equal to 17.4 cm second curvature of the toric surface: focal distance equal to 14 cm the foci are spaced apart by 1.4 diopters shape of the spiral: logarithmic to the golden ratio angle of the spiral: 720° lens diameter: 10 mm other geometric parameters: the rear face is spherical with a radius of curvature of 7.8 mm. The thickness at the center of the lens 400 is equal to 0.5 mm.

Generally, an optical lens of tubular focus according to the invention may be designed similarly to one of the illustrated optical lenses 200, 400, 800 using any number of toric surfaces each occupying one azimuthal angular sector. Thus, the number of toric branches distributed about the optical axis in the spiral surface may be even (for example 2 branches in the optical lens 800, 4 branches in the optical lens 200) or uneven (for example 3 branches in the optical lens 400). Other numbers of branches are possible, for example 5, 6, 7 or more.

Moreover, the borders between the adjacent toric surfaces may be abrupt borders or graded borders. For example, the local curvature may be interpolated in the vicinity of the borders to provide gentle regions of transition between adjacent toric surfaces and thus limit extreme slopes.

Figure 10:
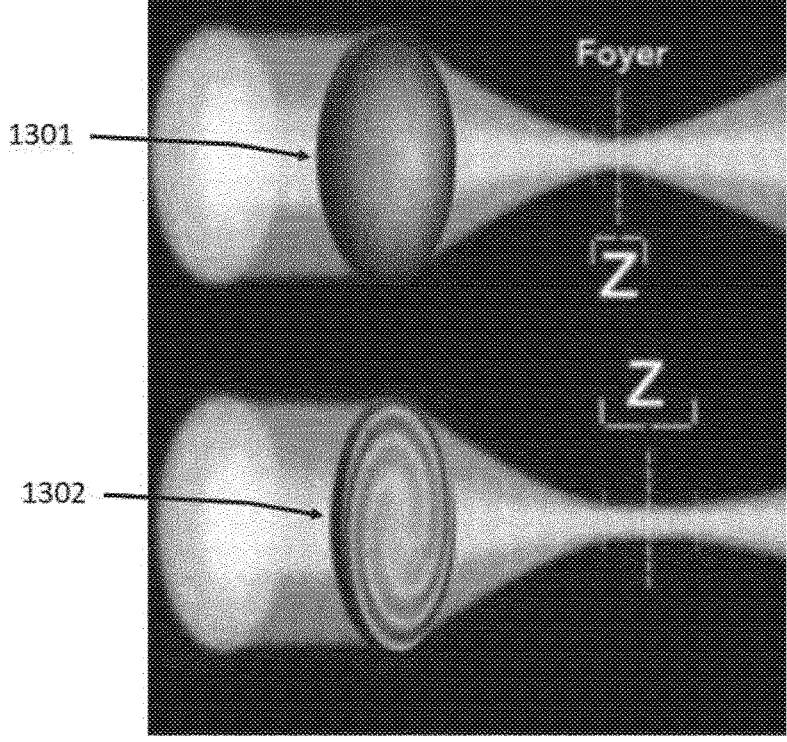
FIG. 10 is a schematic profile view of the distribution of a parallel light beam having passed through an optical lens according to the invention and by comparison a spherical optical lens according to the prior art.

The tubular focus obtained according to the invention is shown in FIG. 10 by comparison between a spherical optical lens 1301 according to the prior art and an optical lens of tubular focus according to the invention 1302, each of these two lenses 1301, 1302 being designed for a correction of vision. In FIG. 10, a parallel illumination is incident on the lenses 1301 and 1302, Z designating a region of sharpness perceived by the human eye that lies on either side of the object focal point of the lenses. As may be very clearly seen from FIG. 10, the lens 1302 with the spirals allows an elongation of the region of sharpness Z bounded by an imaginary right cylinder to be obtained. Thus, the spiralization of the various optical powers allows a tubular focus of the light rays to be obtained. In other words, if in a prior-art spherical lens 1301 one of the two dioptric interfaces is replaced by the spiraled toric surface 1302 according to the present invention, this has the effect of lengthening the focal region. The stigmatism region is then no longer a point, but a focus tube.

Figure 11:
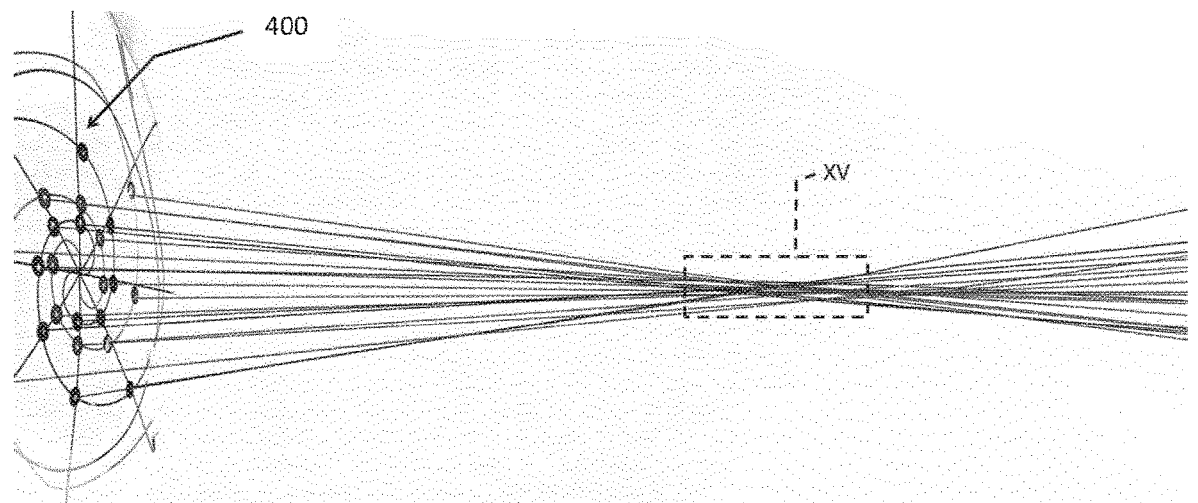
FIG. 11 is a schematic perspective view of a beam of parallel light rays having passed through an optical lens according to the invention with logarithmic spirals, FIG. 11 showing the tubular region of focus of the light ray.

The inventor has performed an optical ray-tracing computation for a parallel illumination. FIG. 11 shows a lens 400 like that of FIG. 9, on the side of the object focal point. The focus region XV has been shown enlarged in the upper portion of FIG. 12.

Figure 12:
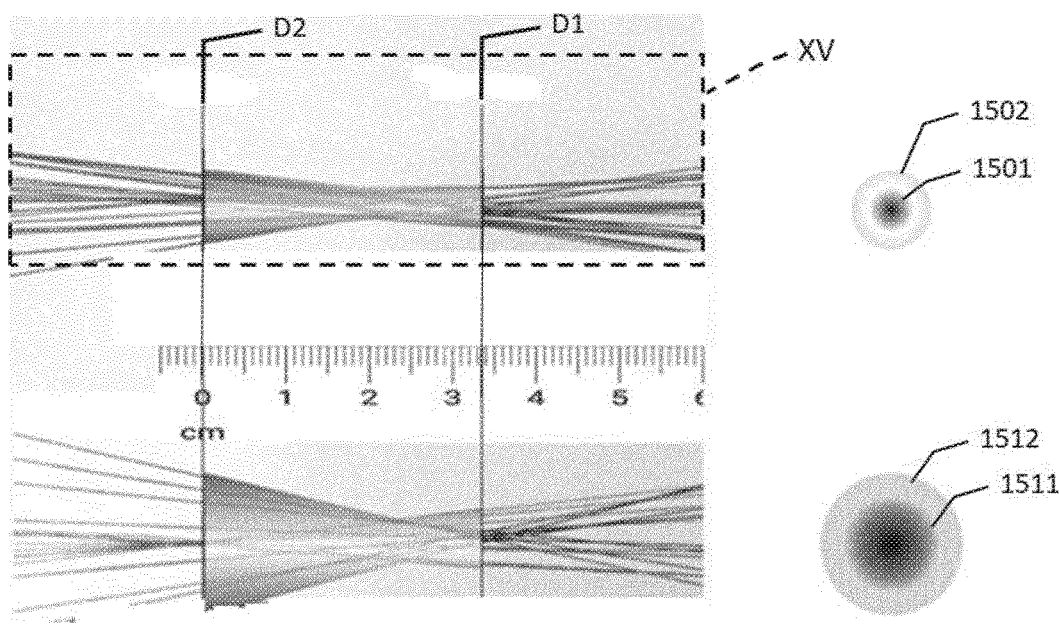
FIG. 12 is an enlarged view of the tube of focus of the beam of light rays of FIG. 11 and by comparison the focal region of a lens with toric surfaces in axial opposition as illustrated in FIG. 6.

FIG. 12 also shows the focal distances D1 and D2 corresponding to the first curvature and to the second curvature of the initial toric surface, respectively. On the right of FIG. 12, the line 1501 shows the size of the focal spot at D1 and the line 1502 shows the size of the focal spot at D2.

By comparison, the lower portion of FIG. 12 shows the same elements for an astigmatic lens in axial opposition as in FIG. 6, having the same curvatures as the initial ones of FIG. 11: the line 1511 shows the size of the focal spot at D1 and the line 1512 shows the size of the focal spot at D2.

It may clearly be seen from FIG. 12, that the spiralization of a lens according to the invention has the effect of compressing the focal spot between D1 and D2 substantially into the form of an imaginary right cylinder.

Other variants and advantages of the invention may be realized without however departing from the scope of the invention.

If in the examples illustrated, the spiral segments were produced so as to extend right across the optical surface of the lens, it is possible to envisage carrying out the spiralization only over one portion.

Figure 13:
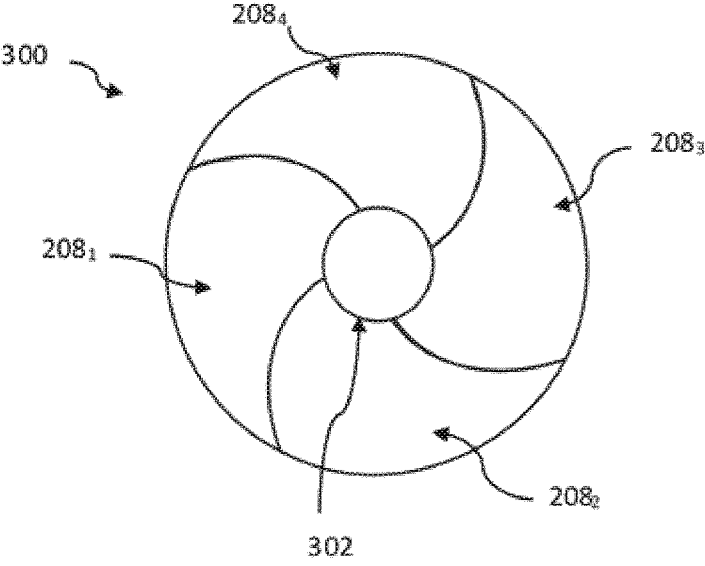
FIG. 13 is a face-on view of a variant embodiment of a lens of tubular focus according to the invention comprising a spherical central portion and a spiral peripheral portion.

FIG. 13 thus illustrates a variant according to which the optical lens 300 comprises a spherical surface 302 arranged at the center of the optical surface of the lens 300, the spiral segments being produced only on the periphery of the optical surface.

Figure 14:
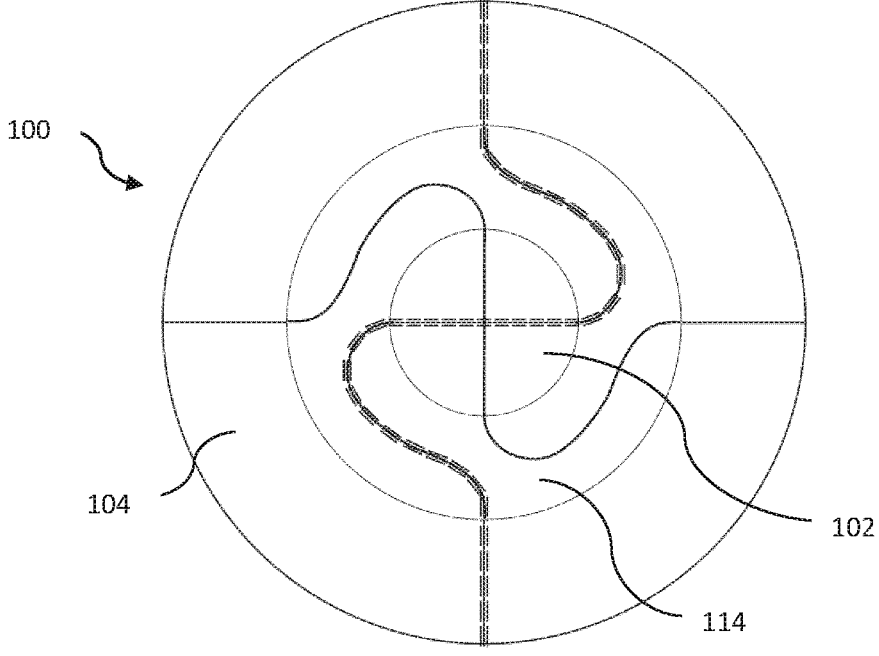
FIG. 14 is a face-on view of another variant embodiment of a lens of tubular focus according to the invention comprising two toric surfaces and a junction portion therebetween that is spiraled.

FIG. 14 illustrates a variant according to which an optical lens 100 with two concentric toric surfaces 102, 104 has a junction portion 114 that is spiraled according to the invention.

The invention is not limited to the examples that have just been described; it is in particular possible to combine features of the examples illustrated within variants that are not illustrated.

The invention claimed is:

1. An optical device for providing a lengthened focal region and having an optical axis, the optical device comprising at least one surface with at least two meridians, at least one portion of said surface forms, seen face-on, at least one spiral segment the central point of which is on the optical axis, each spiral segment defining meridians of different optical powers, in order that the focus obtained extends over a tubular region having an elongation parallel to the optical axis and is retained the same throughout the elongation, the one or more spiral segments being bounded by border lines, with each border line being a spiral border line, see face-on, that extends from the center point, having a surface contour that follows a surface pattern of a toric surface that has been spiralized by twisting about the center point, and having a first meridian curved with a first non-zero curvature and a second meridian curved with a second curvature strictly greater than the first curvature, the second meridian being perpendicular to the first meridian.

2. The optical device as claimed in claim 1, the one or more spiral segments being generated by spiralization of first and second toric surfaces, the first toric surface having a first meridian curved with a first non-zero curvature about an axis of revolution of a first torus and a second meridian curved with a second curvature strictly greater than the first curvature, the second meridian being perpendicular to the first meridian, the second toric surface having a first meridian curved with a first non-zero curvature about an axis of revolution of a second torus and a second meridian curved with a second curvature strictly greater than the first curvature and perpendicular to the first meridian of the second toric surface, the first and second toric surfaces each comprising a plurality of azimuthal angular sectors arranged about the optical axis, the first meridian of the first toric surface and the first meridian of the second toric surface have azimuthal orientations separated by a non-zero angle about the optical axis, the spiral segments defining first and second optical-power meridians resulting from the first meridian of the first toric surface and from the first meridian of the second toric surface.

3. The optical device as claimed in claim 2, an azimuthal angular sector of the first toric surface and an azimuthal angular sector of the second toric surface being adjacent via a spiral-segment border.

4. The optical device as claimed in claim 2, the first toric surface and second toric surface each comprising two diametrically opposed azimuthal angular sectors.

5. The optical device as claimed in claim 4, each angular sector of the first toric surface being adjacent to the two angular sectors of the second toric surface.

6. The optical device as claimed in claim 2, the angle between the azimuthal orientations of the first meridian of the first toric surface and the first meridian of the second toric surface is comprised between 60° and 90°.

7. The optical device as claimed in claim 2, wherein the first curvature of the first toric surface is equal to the first curvature of the second toric surface.

8. The optical device as claimed in claim 2, wherein the second curvature of the first toric surface is equal to the second curvature of the second toric surface.

9. The optical device as claimed in claim 1, the radius of a spiral segment being related, in polar coordinates, to the angle of the spiral by a linear law, a quadratic law or a logarithmic law.

10. The optical device as claimed in claim 1, furthermore comprising a spherical surface centered on the optical axis.

11. The optical device as claimed in claim 1, forming an optical lens the front face of which is the surface with at least one spiral segment.

12. The use of an optical device as claimed in claim 1, to correct vision and/or to concentrate luminous power and/or to form an image.

\*    \*    \*    \*    \*